(12) United States Patent
Mannava

(10) Patent No.: US 6,215,097 B1
(45) Date of Patent: *Apr. 10, 2001

(54) ON THE FLY LASER SHOCK PEENING

(75) Inventor: Seetharamaiah Mannava, Cincinnati, OH (US)

(73) Assignee: General Electric Company, Cincinnati, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 08/362,362

(22) Filed: Dec. 22, 1994

(51) Int. Cl.$^7$ ................................................. B23K 26/00
(52) U.S. Cl. ......................... 219/121.69; 219/121.85; 148/565
(58) Field of Search .................... 219/121.65, 121.66, 219/121.69, 121.84, 121.82, 121.85; 148/525, 565

(56) References Cited

U.S. PATENT DOCUMENTS

| | | | |
|---|---|---|---|
| 3,850,698 | * 11/1974 | Mallozzi et al. | 148/525 |
| 4,401,477 | * 8/1983 | Clauer et al. | 148/525 |
| 4,411,730 | * 10/1983 | Fishter et al. | 219/121.69 |
| 4,426,867 | 1/1984 | Neal et al. | 72/53 |
| 4,645,547 | * 2/1987 | Krause et al. | 219/121.69 |
| 4,937,421 | * 6/1990 | Ortiz, Jr. et al. | 219/121.69 |
| 4,972,061 | * 11/1990 | Duley et al. | 219/121.66 |
| 5,127,019 | * 6/1992 | Epstein et al. | 372/108 |
| 5,131,957 | * 7/1992 | Epstein et al. | 148/565 |
| 5,235,838 | * 8/1993 | Berstein | 148/510 |
| 5,316,720 | * 5/1994 | Spiegel et al. | 419/48 |
| 5,756,965 | * 5/1998 | Mannava | 219/121.85 |

OTHER PUBLICATIONS

American Machinist, "Laser Shocking Extends Fatigue Life", by John A. Vaccari, pp. 62–64, Jul. 1992, A Penton Publication.

* cited by examiner

Primary Examiner—Samuel M. Heinrich
(74) Attorney, Agent, or Firm—Andrew C. Hess; Gerry S. Gressel

(57) ABSTRACT

An on the fly method of laser shock peening a gas turbine engine part by continuously moving a metallic gas turbine engine part while continuously firing a stationary laser beam, which repeatably pulses between relatively constant periods, on a portion of the part with sufficient power to vaporize material on the surface of the portion of the part with the pulses around laser beam spots formed by the laser beam on the surface and form a region having deep compressive residual stresses extending into the part from the laser shock peened surface. Flowing a curtain of water over the surface upon which the laser beam is firing while moving the part until the laser shock peened surface is completely covered by laser beam spots at least once. The surface may covered by a paint which is then the material used to produce the plasma or the surface may be unpainted and the metal of the part is used to produce the plasma. The part such a fan or compressor blade may be moved linearly to produce at least one row of overlapping circular laser beam spots having generally equally spaced apart linearly aligned center points.

14 Claims, 6 Drawing Sheets

ON THE FLY LASER SHOCK PEENING

The present Application deals with related subject matter in U.S. patent application Ser. No. 08/319,346, entitled "LASER SHOCK PEENED ROTOR COMPONENTS FOR TURBOMACHINERY", filed Oct. 6, 1994, assigned to the present Assignee, now U.S. Pat. No. 5,492,447.

The present Application deals with related subject matter in U.S. patent application Ser. No. 08/373,133, now U.S. Pat. No. 5,591,009 entitled "LASER SHOCK PEENED GAS TURBINE ENGINE FAN BLADE EDGES", filed Dec. 16, 1994, assigned to the present Assignee.

BACKGROUND OF THE INVENTION

1. Field of the Invention

This invention relates to laser shock peening of gas turbine engine parts and, more particularly, for airfoil leading and trailing edges such as on fan and compressor blades having localized compressive residual stresses imparted by laser shock peening.

2. Description of Related Art

Gas turbine engines and, in particular, aircraft gas turbine engines rotors operate at high rotational speeds that produce high tensile and vibratory stress fields within the blade and make the fan blades susceptible to foreign object damage (FOD). Vibrations may also be caused by vane wakes and inlet pressure distortions as well as other aerodynamic phenomena. This FOD causes nicks and tears and hence stress concentrations in leading and trailing edges of fan blade airfoils. These nicks and tears become the source of high stress concentrations or stress risers and severely limit the life of these blades due to High Cycle Fatigue (HCF) from vibratory stresses. FOD damage may also result in a loss of engine due to a release of a failed blade. It is also expensive to refurbish and/or replace fan blades and, therefore, any means to enhance the rotor capability and, in particular, to extend aircraft engine fan blade life is very desirable. The present solution to the problem of extending the life of fan blades is to design adequate margins by reducing stress levels to account for stress concentration margins on the airfoil edges. This is typically done by increasing thicknesses locally along the airfoil leading edge which adds unwanted weight to the fan blade and adversely affects its aerodynamic performance. Another method is to manage the dynamics of the blade by using blade dampers. Dampers are expensive and may not protect blades from very severe FOD. These designs are expensive and obviously reduce customer satisfaction.

Therefore, it is highly desirable to design and construct longer lasting fan and compressor blades, as well as other gas turbine engine parts, that are better able to resist both low and high cycle fatigue than present day parts. The above referenced U.S. patent applications Ser. No. 08/319,346, entitled "LASER SHOCK PEENED ROTOR COMPONENTS FOR TURBOMACHINERY", and U.S. patent application Ser. No. 08/373,133, entitled "LASER SHOCK PEENED GAS TURBINE ENGINE FAN BLADE EDGES", are directed towards this end. The latter, more particularly, provides an airfoil of a fan blade with regions of deep compressive residual stresses imparted by laser shock peening at least a radially extending portion of leading and/or trailing edge surfaces of the fan blade.

The region of deep compressive residual stresses imparted by laser shock peening of the present invention is not to be confused with a surface layer zone of a work piece that contains locally bounded compressive residual stresses that are induced by a hardening operation using a laser beam to locally heat and thereby harden the work piece such as that which is disclosed in U.S. Pat. No. 5,235,838, entitled "Method and apparatus for truing or straightening out of true work pieces". The present invention uses multiple radiation pulses from high power pulsed lasers to produce shock waves on the surface of a work piece similar to methods disclosed in U.S. Pat. No. 3,850,698, entitled "Altering Material Properties"; U.S. Pat. No. 4,401,477, entitled "Laser shock processing"; and U.S. Pat. No. 5,131,957, entitled "Material Properties". Laser peening as understood in the art and as used herein, means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". One issue is manufacturing costs of the laser shock peening process which can be prohibitively expensive. The "on the fly" laser shock peening process of the present invention is designed to provide cost saving methods for laser shock peening.

SUMMARY OF THE INVENTION

A fly method of laser shock peening a gas turbine engine part by continuously moving a metallic gas turbine engine part while continuously firing a stationary laser beam, which repeatably pulses between relatively constant periods, on a portion of the part. The laser beam with sufficient power to vaporize material on the surface of the portion of the part with the pulses around laser beam spots formed by the laser beam on the surface and to form a region having deep compressive residual stresses imparted by the laser shock peening process extending into the part from the laser shock peened surface. The method further includes flowing a curtain of water over the surface upon which the laser beam is firing while moving the part until the laser shock peened surface is completely covered by laser beam spots at least once. The surface may be covered by a paint which is then the material used to produce the plasma or the surface may be unpainted and the metal of the part is used to produce the plasma. The part may be moved linearly to produce at least one row of overlapping circular laser beam spots having generally equally spaced apart linearly aligned center points and the part may be moved and the laser beam fired to produce more than one row of overlapping circular laser beam spots having generally equally spaced apart linearly aligned center points wherein adjacent rows of spots overlap. The laser beam may be fired and the part moved so that the center points of adjacent spots in adjacent rows are also offset from each other a generally equal amount in a direction along a line on which the center points are linearly aligned.

In another embodiment of the present invention, the painted laser shock peened surface is laser shock peened using a set of sequences in which each sequence the surface is painted and then the part is continuously moved while continuously firing a stationary laser beam on the surface such that adjacent laser shock peened circular spots are hit in different ones of the sequences in the set. In a more particular embodiment, the laser beam is fired and the part moved so that the center points of adjacent spots in adjacent rows are offset from each other a generally equal amount in a direction along a line on which the center points are linearly aligned. A more particular embodiment, each spot is hit more than one time using more than one set of the sequences.

Another embodiment of the present invention includes a further a step of removing remelt formed by the laser firing upon the unpainted laser shock peened surface after it is laser shock peened.

A more particular embodiment of the present invention uses the methods above on a gas turbine engine blade such as on the airfoil of a vane or blade of a fan or compressor section having an airfoil with a leading edge and a trailing edge. The invention may be used along a portion of the edge or along the entire edge of the airfoil such that the laser shock peened surface is at least a part of one of the edges extending radially along at least a portion of and chordwise from the edge.

ADVANTAGES

Among the advantages provided by the present invention is a cost efficient method to laser shock peen surfaces of portions of gas turbine engine parts and in particular blades designed to operate in high tensile and vibratory stress fields which can better withstand fatigue failure due to nicks and tears in the leading and trailing edges of the fan blade and have an increased life over conventionally constructed fan blades. Another advantage of the present invention is that fan and compressor blades can be constructed with cost efficient methods to provide commercially acceptable life spans without increasing thicknesses along the leading and trailing edges, as is conventionally done. The present invention can be advantageously used to refurbish existing fan and compressor blades with a low cost method for providing safe and reliable operation of older gas turbine engine fan blades while avoiding expensive redesign efforts or frequent replacement of suspect fan blades as is now often done or required.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
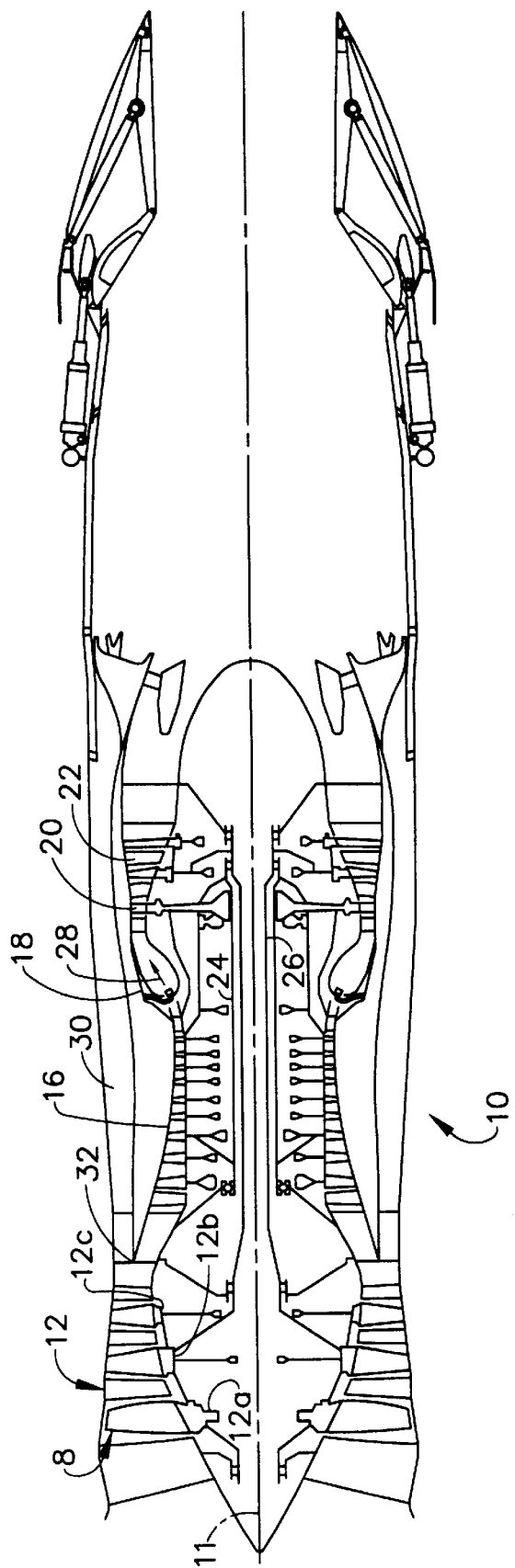
FIG. 1 is a cross-sectional illustrative view of an exemplary aircraft gas turbine engine in accordance with the present invention.

Illustrated in FIG. 1 is a schematic representation of an exemplary aircraft turbofan gas turbine engine 10 including a fan blade 8 in accordance with one embodiment of the present invention. The gas turbine engine 10 is circumferentially disposed about an engine centerline 11 and has, in serial flow relationship, a fan section 12, a high pressure compressor 16, a combustion section 18, a high pressure turbine 20, and a low pressure turbine 22. The combustion section 18, high pressure turbine 20, and low pressure turbine 22 are often referred to as the hot section of the engine 10. A high pressure rotor shaft 24 connects, in driving relationship, the high pressure turbine 20 to the high pressure compressor 16 and a low pressure rotor shaft 26 drivingly connects the low pressure turbine 22 to the fan section 12. Fuel is burned in the combustion section 18 producing a very hot gas flow 28 which is directed through the high pressure and low pressure turbines 20 and 22 respectively to power the engine 10. A portion of the air passing through the fan section 12 is bypassed around the high pressure compressor 16 and the hot section through a bypass duct 30 having an entrance or splitter 32 between the fan section 12 and the high pressure compressor 16. Many engines have a low pressure compressor (not shown) mounted on the low pressure rotor shaft 26 between the splitter 32 and the high pressure compressor 16. The fan section 12 is a multi-stage fan section, as are many gas turbine engines, illustrated by first, second, and third fan stages; 12a, 12b, and 12c respectively. The fan blade 8 of the present invention is designed to be used in a single stage fan section or in any stage of a multi-stage fan section.

Figure 2A:
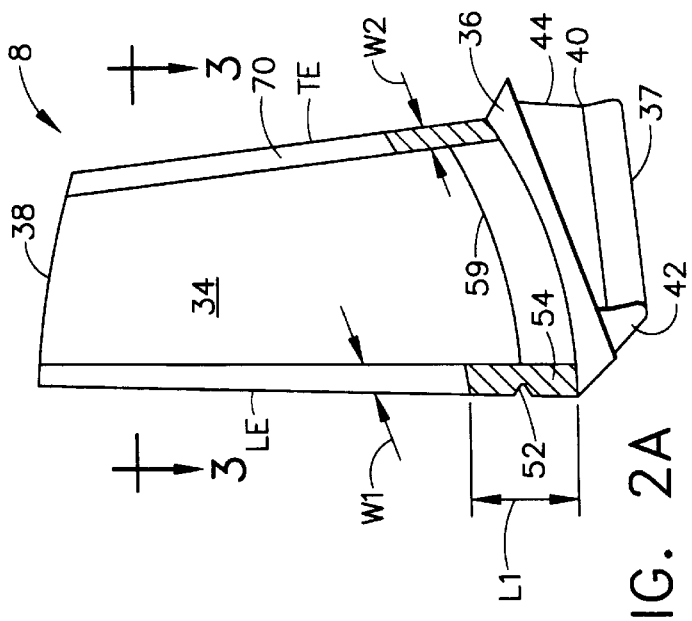
FIG. 2A is a perspective illustrative view of an alternative aircraft gas turbine engine fan blade including a laser shock peened radially extending portion of the leading edge in accordance with the present invention.
Figure 2:
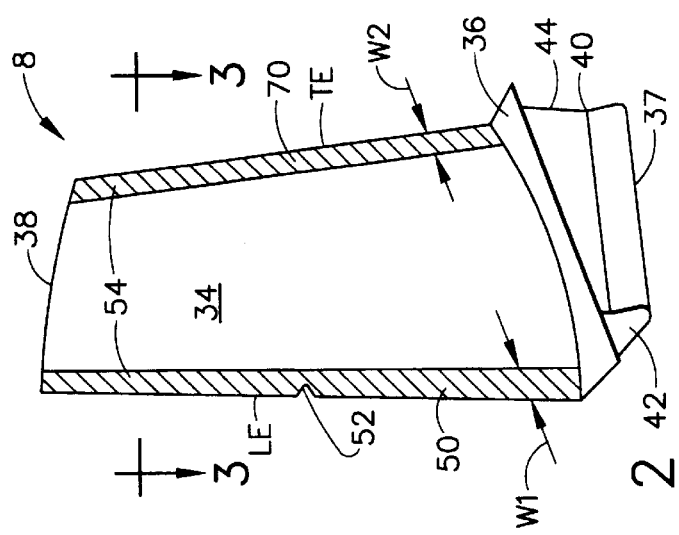
FIG. 2 is a perspective illustrative view of an exemplary aircraft gas turbine engine fan blade in accordance with the present invention.
Figure 3:
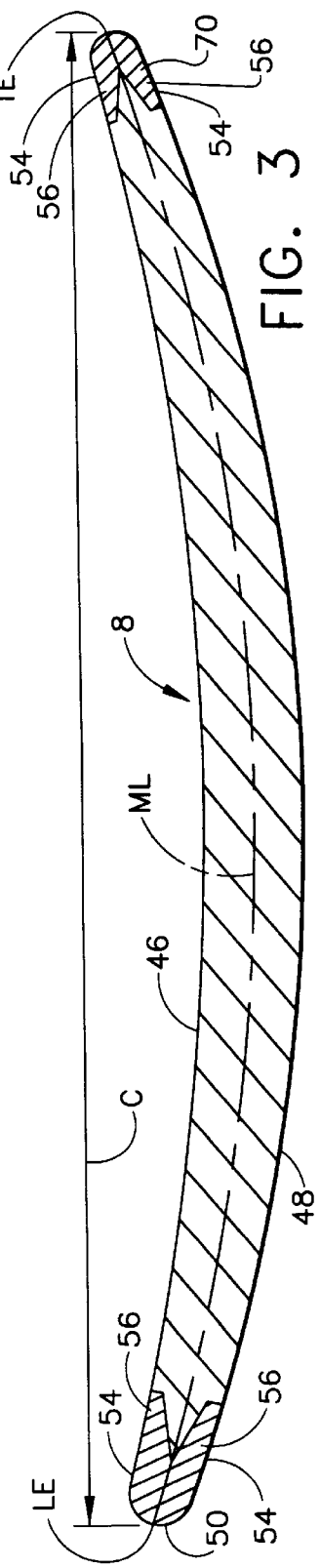
FIG. 3 is a cross sectional view through the fan blade taken along line 3—3 as illustrated in FIG. 2.

Referring to FIGS. 2 and 3, the fan blade 8 includes an airfoil 34 extending radially outward from a blade platform 36 to a blade tip 38. The fan blade 8 includes a root section 40 extending radially inward from the platform 36 to a radially inward end 37 of the root section 40. At the radially inward end 37 of the root section 40 is a blade root 42 which is connected to the platform 36 by a blade shank 44. The airfoil 34 extends in the chordwise direction between a leading edge LE and a trailing edge TE of the airfoil. A chord C of the airfoil 34 is the line between the leading LE and trailing edge TE at each cross section of the blade as illustrated in FIG. 3. A pressure side 46 of the airfoil 34 faces in the general direction of rotation as indicated by the arrow and a suction side 48 is on the other side of the airfoil and a mean-line ML is generally disposed midway between the two faces in the chordwise direction.

Referring again to FIG. 2, fan blade 8 has a leading edge section 50 that extends along the leading edge LE of the airfoil 34 from the blade platform 36 to the blade tip 38. The leading edge section 50 includes a predetermined first width W1 such that the leading edge section 50 encompasses nicks 52 and tears that may occur along the leading edge of the airfoil 34. The airfoil 34 subject to a significant tensile stress field due to centrifugal forces generated by the fan blade 8 rotating during engine operation. The airfoil 34 is also subject to vibrations generated during engine operation and the nicks 52 and tears operate as high cycle fatigue stress risers producing additional stress concentrations around them.

To counter fatigue failure of portions of the blade along possible crack lines that can develop and emanate from the nicks and tears at least one and preferably both of the pressure side 46 and the suction side 48 have a laser shock peened surfaces 54 and a pre-stressed region 56 having deep compressive residual stresses imparted by laser shock peening (LSP) extending into the airfoil 34 from the laser shock peened surfaces as seen in FIG. 3. Preferably, the pre-stressed regions 56 are coextensive with the leading edge section 50 in the chordwise direction to the full extent of width W1 and are deep enough into the airfoil 34 to coalesce for at least a part of the width W1. The pre-stressed regions 56 are shown coextensive with the leading edge section 50 in the radial direction along the leading edge LE but may be shorter. The entire laser shock peened surfaces 54 is formed by overlapping laser shocked peened circular spots 58.

FIG. 2A illustrates the invention for a partial leading edge length pre-stressed regions 56 extending over a laser shock peened surface length Li of the leading edge LE that is generally centered about a predetermined nodal line 59 where it intercepts the leading edge LE. Preferably, the nodal line 59 is one of a dominant failure mode due to vibratory stress. This stress may be due to excitations of the blade in bending and torsional flexure modes. The dominant failure mode may not always be the maximum stress mode but rather a lower stress mode or combination of modes that exist for longer durations over the engine's mission. By way of example the predetermined nodal line 59 illustrated in FIG. 2A is due to a first flex mode. A nick 52 located in this area of the leading edge LE has the greatest potential for failing the blade under resonance in this mode. Further by way of example, the laser shock peened surface length Li of the partial leading edge length pre-stressed regions 56 may extend along the leading edge LE about 20% of the fan blade length from the tip 38 to the platform 36.

The present invention includes a fan blade construction with only the trailing edge TE having laser shock peened surfaces 54 on a trailing edge section 70 having a second width W2 and along the trailing edge TE. The associated pre-stressed regions 56 having deep compressive residual stresses imparted by laser shock peening (LSP) extends into the airfoil 34 from the laser shock peened surfaces 54 on the trailing edge section 70. At least one and preferably both of the pressure side 46 and the suction side 48 have a laser shock peened surfaces 54 and a pre-stressed region 56 having deep compressive residual stresses imparted by laser shock peening (LSP) extending into the airfoil 34 from the laser shock peened surfaces on a trailing edge section along the trailing edge TE. Preferably, the compressive pre-stressed regions 56 are coextensive with the leading edge section 50 in the chordwise direction to the full extent of width W2 and are deep enough into the airfoil 34 to coalesce for at least a part of the width W2. The compressive pre-stressed regions 56 are shown coextensive with the leading edge section 50 in the radial direction along the trailing edge TE but may be shorter, extending from the tip 38 a portion of the way along the trailing edge TE towards the platform 36.

Figure 6:
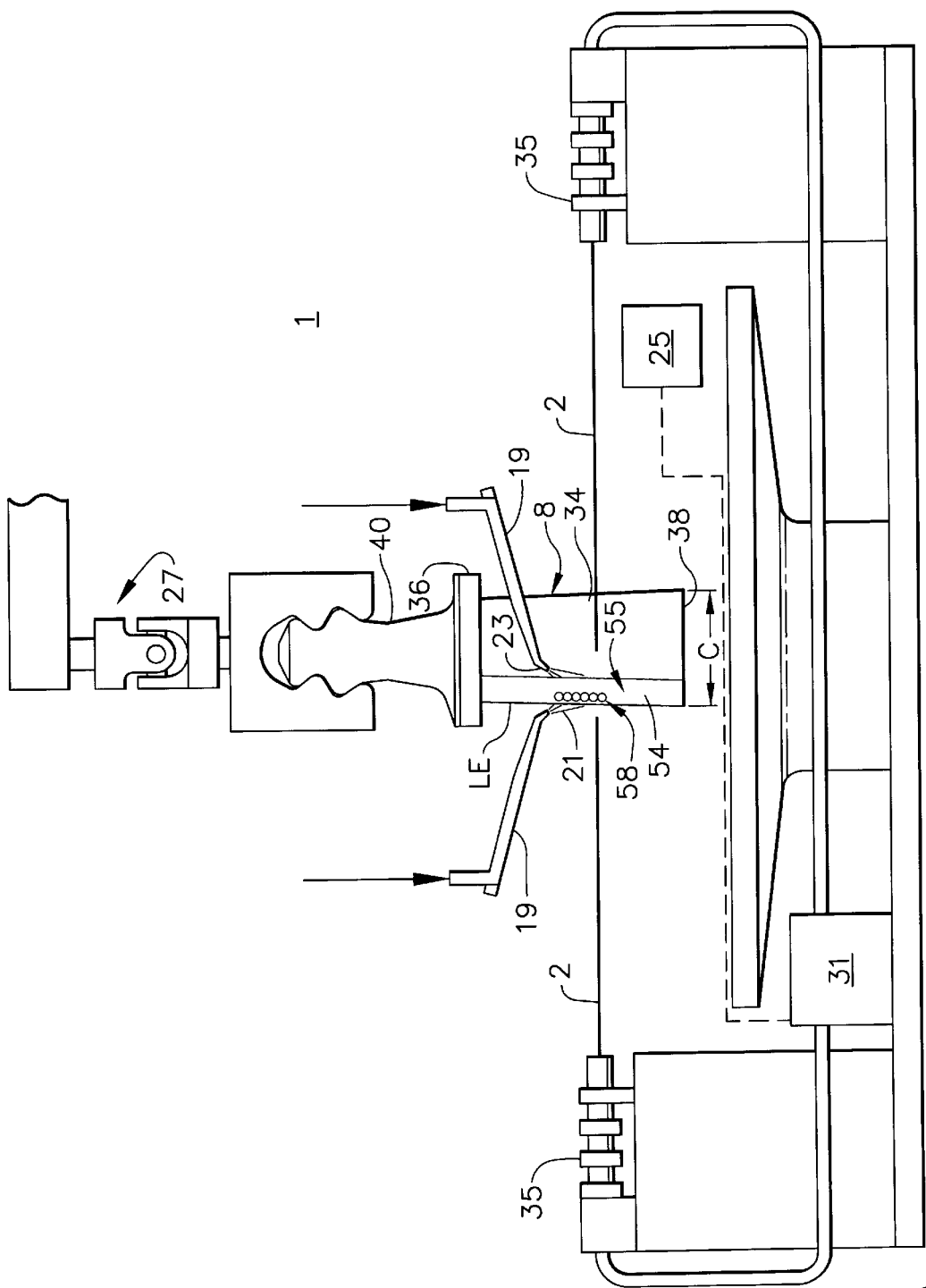
FIG. 6 is a schematical perspective view of the blade of FIG. 1 painted and mounted in a laser shock peening system illustrated the method of the present invention.
Figure 7:
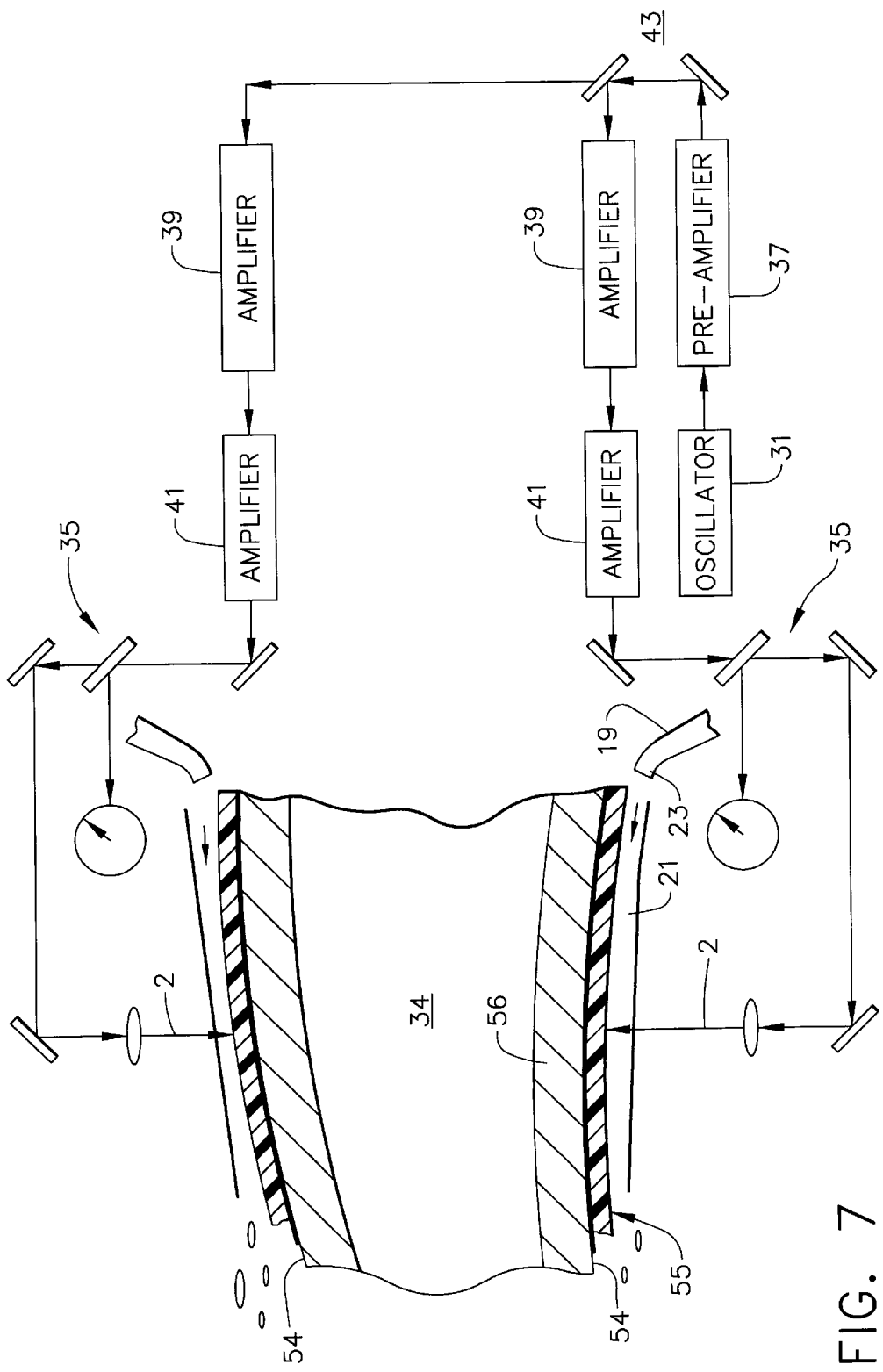
FIG. 7 is a partial cross-sectional and a partial schematic view of the setup in FIG. 7.

Referring to FIGS. 6 and 7, the laser beam shock induced deep compressive residual stresses in the compressive pre-stressed regions 56 are generally about 50–150 KPSI (Kilo Pounds per Square Inch) extending from the laser shocked surfaces 54 to a depth of about 20–50 mils into laser shock induced compressive residually stressed regions 56. The laser beam shock induced deep compressive residual stresses are produced by repetitively firing two high energy laser beams 2 each of which is defocused ± a few mils with respect to the surfaces 54 on both sides of the leading edge LE which are covered with paint 55. The laser beam typically has a peak power density on the order of magnitude of a gigawatt/cm$^2$ and is fired through a curtain of flowing water that is flowed over the painted surface 54. The paint is ablated generating plasma which results in shock waves on the surface of the material. These shock waves are re-directed towards the painted surface by the curtain of flowing water to generate travelling shock waves (pressure waves) in the material below the painted surface. The amplitude and quantity of these shockwave determine the depth and intensity of compressive stresses. The paint is used to protect the target surface and also to generate plasma. Illustrated in FIGS. 6 and 7 is an apparatus 1 which has the blade 8 mounted in a conventionally well known robotic arm 27 used to continuously move and position the blade to provide laser shock peening "on the fly" in accordance with one embodiment of the present invention. The laser shock peened surfaces 54 on both the pressure and suction sides 46 and 48 respectively of the leading edge LE are painted with an ablative paint 55. Then the blade 8 is continuously moved while continuously firing the stationary laser beams 2 through a curtain of flowing water 21 on the surfaces 54 and forming overlapping laser shock peened circular spots 58. The curtain of water 21 is illustrated as being supplied by a conventional water nozzle 23 at the end of a conventional water supply tube 19. The laser shock peening apparatus 1 has a conventional generator 31 with an oscillator 33 and a pre-amplifier 37 and a beam splitter 43 which feeds the pre-amplified laser beam into two beam optical transmission circuits each having a first and second amplifier 39 and 41, respectively, and optics 35 which include optical elements that transmit and focus the laser beam 2 on the laser shock peened surfaces 54. A controller 24 may be used to modulate and control the laser beam apparatus 1 to fire the laser beams 2 on the laser shock peened surfaces 54 in a controlled manner. Ablated paint material is washed out by the curtain of flowing water.

Figure 4:
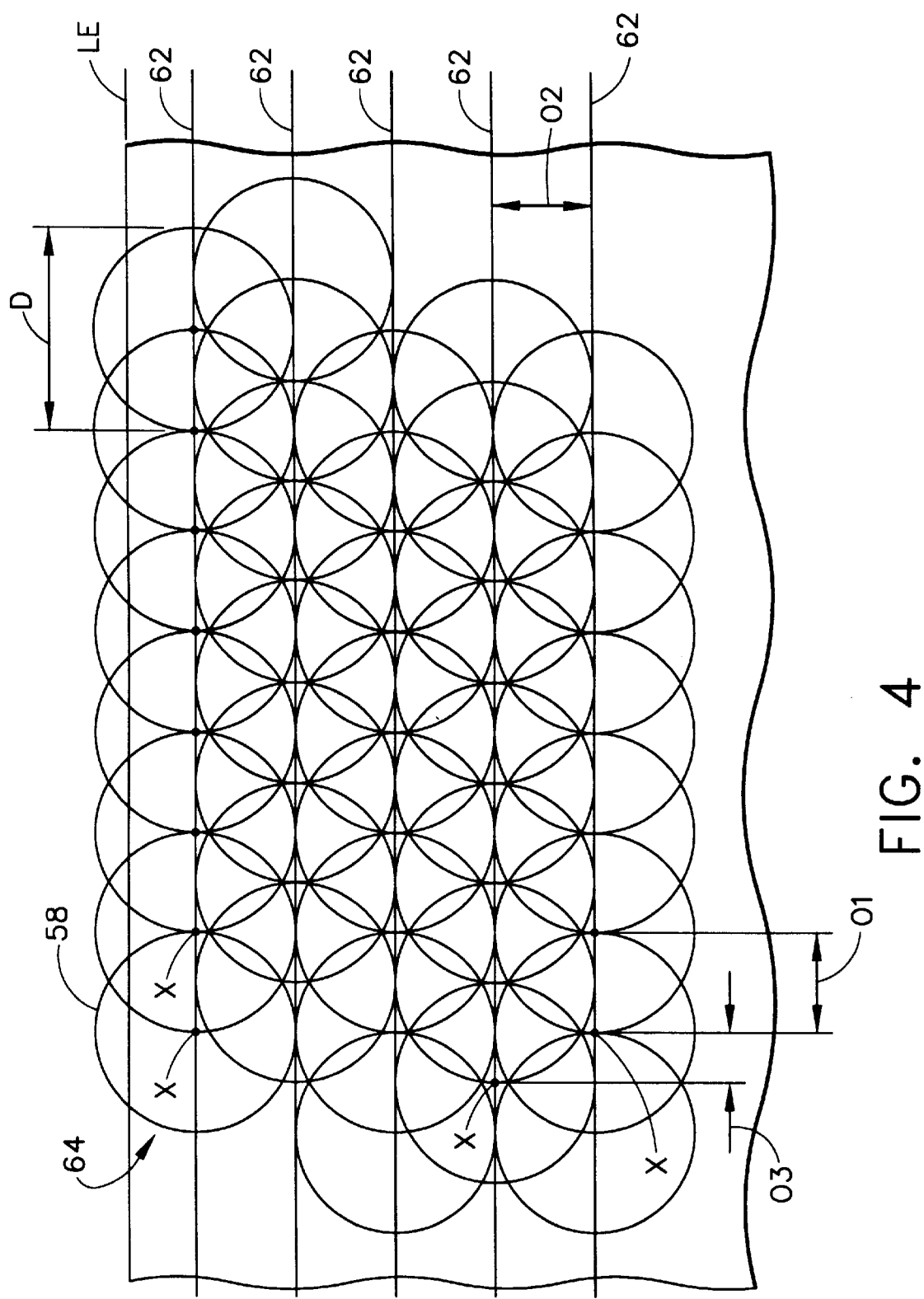
FIG. 4 is a schematic illustration of a pattern of laser shocked peened circular spots on a laser shock peened surface along a leading edge of the fan blade in FIG. 2.
Figure 5:
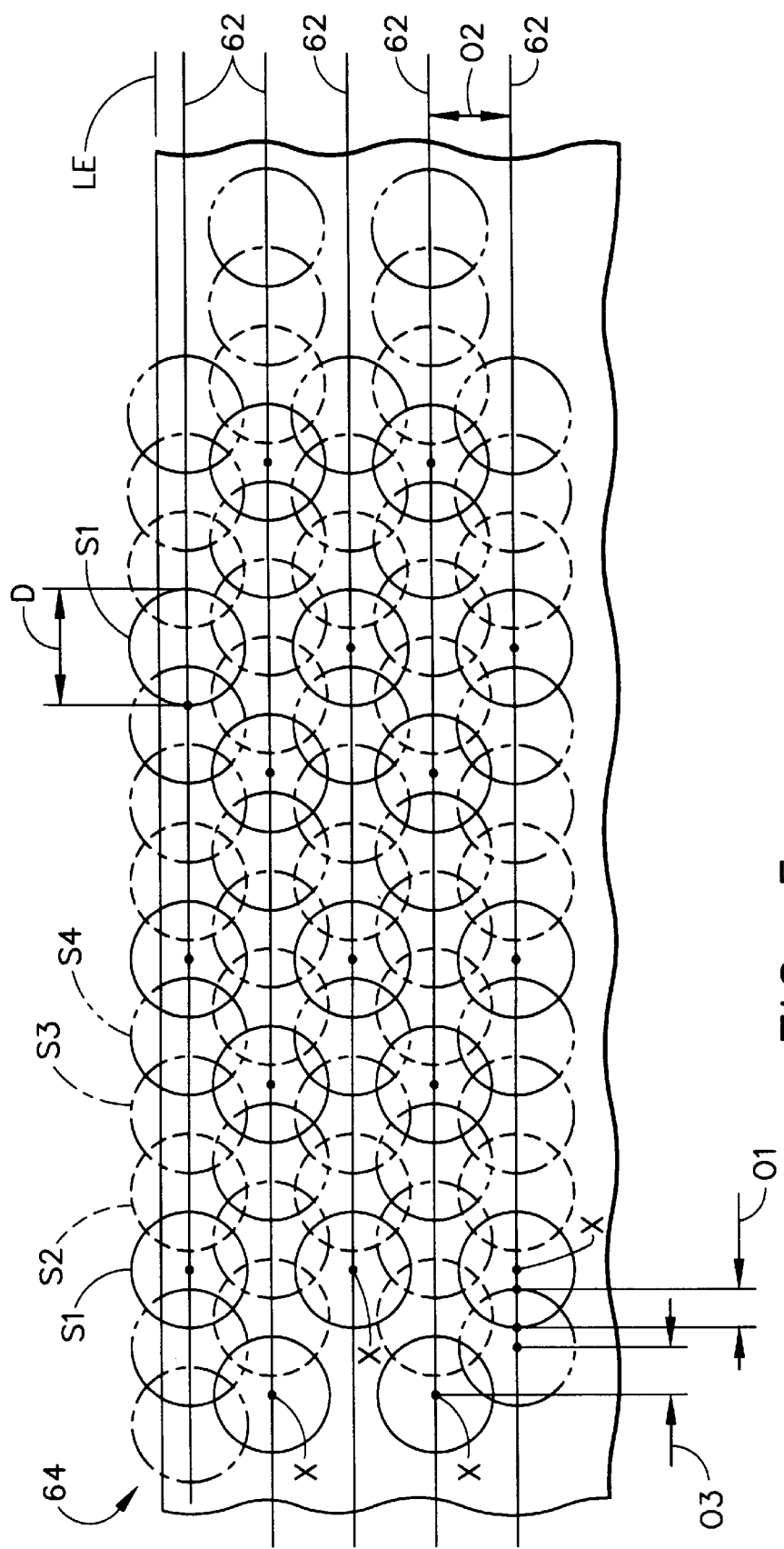
FIG. 5 is a schematic illustration of a particular pattern having four sequences of laser shocked peened circular spots that don't overlap within a given sequence.

The laser may be fired sequentially "on the fly", as illustrated in FIG. 4, so that the laser shock peened surface 54 is laser shock peened with more than one sequence of painting the surface and then continuously moving the blade while continuously firing the laser beam on the surface such that adjacent laser shock peened circular spots are hit in different sequences. FIGS. 4 and 5 illustrates a pattern of laser shocked peened circular spots 58 (indicated by the circles) of four such sequences S1 through S4. The S1 sequence is shown as full line circles, as opposed to dotted line circles of the other sequences, to illustrate the feature of having non adjacent laser shocked peened circular spots 58 with their corresponding centers X along a row centerline 62. The pattern of sequences entirely covers the laser shock peened surface 54. The laser shocked peened circular spots 58 have a diameter D in a row 64 of overlapping laser shock peened circular spots. The pattern may be of multiple overlapping rows 64 of overlapping shock peened circular spots on the laser shock peened surfaces 54. A first overlap is between adjacent laser shock peened circular spots 58 in a given row and is generally defined by a first offset O1 between centers X of the adjacent laser shock peened circular spots 58 and can vary from about 30%–50% or more of the diameter D. A second overlap is between adjacent laser shock peened circular spots 58 in adjacent rows and is generally defined by a second offset O2 between adjacent row centerlines 62 and can vary from about 30%–50k of the diameter D depending on applications and the strength or fluency of the laser beam. A third overlap in the form of a linear offset O3 between centers X of adjacent laser shock peened circular spots 58 in adjacent rows 64 and can vary from about 30%–50% of the diameter D depending on a particular application.

This method is designed so that only virgin or near virgin paint is ablated away without any appreciable effect or damage on the surface of the airfoil. This is to prevent even minor blemishes or remelt due to the laser which might otherwise cause unwanted aerodynamic effects on the blade's operation. Several sequences may be required to cover the entire pattern and re-painting of the laser shock peened surfaces 54 is done between each sequence of laser firings. The laser firing each sequence has multiple laser firings or pulses with a period between firings that is often referred to a "rep". During the rep the part is moved so that the next pulse occurs at the location of the next laser shocked peened circular spot 58. Preferably the part is moved continuously and timed to be at the appropriate location at the pulse or firing of the laser beam. One or more repeats of each sequence may be used to hit each laser shocked peened circular spot 58 more than once. This may also allow for less laser power to be used in each firing or laser pulse.

One example of the present invention is a fan blade 8 having an airfoil about 11 inches long, a chord C about 3.5 inches, and laser shock peened surfaces 54 about 2 inches long along the leading edge LE. The laser shock peened surfaces 54 are about 0.5 inches wide (WI). A first row 64 of laser shocked peened circular spots 58 nearest the leading edge LE extends beyond the leading edge by about 20% of the laser spot diameter D which is about 0.27" thus imparting deep compressive residual stresses in the pre-stressed region 56 below the laser shock peened surfaces 54 which extend about 0.54 inches from the leading edge. Four sequences of continuous laser firings and blade movement are used. The firings between reps of the laser are done on spots 58 which lie on unablated painted surfaces which requires a repaint between each of the sequences. Each spot 58 is hit three times and therefore three sets of four sequences are used for a total of twelve paint and repaints of the laser shock peened surface 54.

Illustrated in FIG. 5 is an alternative embodiment of a laser shock peened process in accordance with the present invention. The process may be used to laser shock peen the entire leading edge as illustrated in FIG. 2 or a portion of the leading edge of the fan blade a shown in FIG. 2A using five rows of laser shock peened spots and covering the entire area of laser shock peened surfaces 54 in four sequences designated S1, S2, S3 and S4. The laser shock peening process starts with the first sequence where every four spots is laser shock peened on sequence 1 while the blade is continuously moved and the laser beam is continuously fired or pulsed and the laser. The part is timed to move between adjacent laser shock peened spots in the given sequence such as S1. The timing coincides with the rep between the pulses of the continuous laser firing on the blade. All five rows of the overlapping laser shocked peened circular spots 58 contain spots of each sequence spaced apart a distance so that other laser shock peened circular spots of the same sequence don't effect the paint around it. Sequence 1, preceded by a first painting, is shown by the complete or full circles in the FIG. 4 while the other laser shock peened spots such as in sequence S2, S3 and S4 are illustrated as dotted line, single dashed line, and double dashed line circles respectively. Before the next sequence, such as between sequence S1 and sequence S2, the entire area of the laser shock peened surfaces 54 to be laser shock peened is repainted. This procedure of repainting avoids any of the bare metal of the laser shock peened surface from being hit directly with the laser beam. For an area coverage of five rows with the spacing between rows and between adjacent spots of about 30%, it is found that one paint and three repaints will be necessary so that the part is actually painted four times in total which is somewhat of a time consuming process. It has been found desirable to laser shock peen a given part, such as a fan blade, with between two and five rows. It has also been found desirable to laser shock peen each spot 58 up to 3 or more times. If each spot 58 is hit 3 times then 1 paint and 11 repaints is required for three sets of sequences S1–S4 for a total of 12 paintings.

It has been found that the part can be laser shock peened without any paint using on the fly laser shock peening which saves a considerable amount of time by not having to repaint. Furthermore, since it is often desired to laser shock peen each surface more than once and, in particular, three times, it is possible to save twelve paintings of the surface by laser shock peening without any paint at all. The laser shock peening without paint may use a lower laser beam fluency or use the same power level as with paint. The plasma that is created is made up of the metal alloy material of the blade or part itself. In such a case, a remelt will be left on the laser shock peened area after the laser shock peening or pulsing part of the process is completed. This remelt will usually have to be removed in any one of many well known processes such as by mechanical or chemical removing of the layer. The usefulness of a non-painted part with on the fly laser shock peening will depend on the thickness of the part and careful attention must particularly be given to thin airfoil leading and trailing edges. It has been found that two to five rows of laser shock spots without painting is a very useful number for fan and compressor blades. It should be noted that the plasma and the metal alloy without paint rehardens and forms what is known as a remelt and therefore will require a removal in one of the well known fashions.

The no paint "on the fly" laser shock peening process of the present invention forms the above mentioned plasma with metal alloy on the surface of the airfoil and a single continuous sequence of overlapping spots 58 may be used, as illustrated in FIG. 6, for as many rows as desired. After the laser shock peening process is done the laser shock peened surface may be removed to a depth sufficient to remove the remelt that forms on the surface that might interfere with the airfoils operation.

Referring more specifically to FIG. 3, the present invention includes a fan blade 8 construction with either the leading edge LE or the trailing edge TE sections or both the leading edge LE and the trailing edge TE sections having laser shock peened surfaces 54 and associated pre-stressed regions 56 with deep compressive residual stresses imparted by laser shock peening (LSP) as disclosed above. The laser shocked surface and associated pre-stressed region on the trailing edge TE section is constructed similarly to the leading edge LE section as described above. Nicks on the leading edge LE tend to be larger than nicks on the trailing edge TE and therefore the first width W1 of the leading edge section 50 may be greater than the second width W2 of the trailing edge section 70. By way of example W1 may be about 0.5 inches and W2 may be about 0.25 inches.

While the preferred embodiment of the present invention has been described fully in order to explain its principles, it is understood that various modifications or alterations may be made to the preferred embodiment without departing from the scope of the invention as set forth in the appended claims.

I claim:

1. An on the fly method of laser shock peening a gas turbine engine part, said method comprising the following steps:

continuously moving a metallic gas turbine engine part while continuously firing a stationary laser beam, which repeatably pulses with relatively constant periods between the pulses, on a portion of the part, using a laser beam with sufficient power to vaporize material on a laser shock peened surface of the portion of the part with the pulses around laser beam spots formed by the laser beam on the surface to form a region having deep compressive residual stresses extending into the part from the laser shock peened surface, flowing a curtain of water over the surface upon which the laser beam is firing while moving the part until the laser shock peened surface is completely covered by the laser beam spots at least once, wherein the part is moved and the laser beam is fired to produce more than one row of overlapping circular laser beam spots having generally equally spaced apart linearly aligned center points wherein adjacent rows of spots overlap, and wherein the laser shock peened surface is laser shock peened using a set of sequences wherein each sequence comprises covering the surface with a material suitable to generate a plasma which results in shock waves to form the region having deep compressive residual stresses and then continuously moving the part while continuously firing a stationary laser beam on the surface such that adjacent laser shock peened circular spots are hit in different ones of said sequences in said set.

2. A method as claimed in claim 1 wherein:

the metallic gas turbine engine part is a gas turbine engine blade having a leading edge and a trailing edge, the portion of the part is one of the edges, and the laser shock peened surface is on at least a part of one of the edges extending radially along at least a portion of said one of the edges.

3. A method as claimed in claim 2 further comprising simultaneously laser shock peening two laser shock peened surfaces each of which is on one of two sides of the part by continuously moving the part while continuously firing using two stationary laser beams which repeatably pulse between relatively constant periods, on the portion of the blade, using the laser beams with sufficient power to vaporize material on the two surfaces of the portion of the blade with the pulses around laser beam spots formed by the laser beam on the surfaces to form regions having deep compressive residual stresses extending into the blade from the laser shock peened surfaces, and flowing a curtain of water over the surfaces upon which the laser beam is firing while moving the blade until the laser shock peened surfaces are completely covered by laser beam spots at least once.

4. A method as claimed in claim 2 wherein the part is moved linearly to produce at least one row of overlapping circular laser beam spots having generally equally spaced apart linearly aligned center points.

5. A method as claimed in claim 4 wherein the part is moved and the laser beam is fired to produce more than one row of overlapping circular laser beam spots having generally equally spaced apart linearly aligned center points wherein adjacent rows of spots overlap.

6. A method as claimed in claim 4 wherein the laser beam is fired and the part moved so that the center points of adjacent spots in adjacent rows are offset from each other a generally equal amount in a direction along a line on which the center points are linearly aligned.

7. A method as claimed in claim 5 further comprising simultaneously laser shock peening two laser shock peened surfaces each of which is on one of two sides of the part by continuously moving the part while continuously firing using two stationary laser beams which repeatably pulse between relatively constant periods, on the portion of the blade, using the laser beams with sufficient power to vaporize material on the two surfaces of the portion of the blade with the pulses around laser beam spots formed by the laser beam on the surfaces to form regions having deep compressive residual stresses extending into the blade from the laser shock peened surfaces, and flowing a curtain of water over the surfaces upon which the laser beam is firing while moving the blade until the laser shock peened surfaces are completely covered by laser beam spots at least once.

8. A method as claimed in claim 2 wherein a first row of the laser shocked peened circular spots nearest the edge extends beyond said one of the edges.

9. A method as claimed in claim 8 wherein the part is moved linearly to produce at least one row of overlapping circular laser beam spots having generally equally spaced apart linearly aligned center points.

10. A method an claimed in claim 9 wherein the part is moved and the laser beam is fired to produce more than one row of overlapping circular laser beam spots having generally equally spaced apart linearly aligned center points wherein adjacent rows of spots overlap.

11. A method as claimed in claim 10 wherein the laser beam in fired and the part moved so that the center points of adjacent spots in adjacent rows are offset from each other a generally equal amount in a direction along a line on which the center points are linearly aligned.

12. An on the fly method of laser shock peening a gas turbine engine part, said method comprising the following steps:

continuously moving a metallic gas turbine engine part while continuously firing a stationary laser beam, which repeatably pulses with relatively constant periods between the pulses, on a portion of the part, using a laser beam with sufficient power to vaporize material on a laser shock peened surface of the portion of the part with the pulses around laser beam spots formed by the laser beam on the surface to form a region having deep compressive residual stresses extending into the part from the laser shock peened surface, flowing a curtain of water over the surface upon which the laser beam is firing while moving the part until the laser shock peened surface is completely covered by the laser beam spots at least once, wherein the part is moved and the laser beam is fired to produce more than one row of overlapping circular laser beam spots having generally equally spaced apart linearly aligned center points wherein adjacent rows of spots overlap, wherein the laser shock peened surface is laser shock peened using a set of sequences wherein each sequence comprises continuously moving the part while continuously firing a stationary laser beam on the surface to form every other spot in each of said adjacent rows such that adjacent laser shock peened circular spots in the each of said adjacent row are hit in different ones of said sequences wherein the part is moved and the laser beam is fired to produce more that one row of overlapping circular laser beam spots more than one row of overlapping circular laser beam spots having generally equally spaced apart linearly aligned center points wherein adjacent rows of spots overlap, and the laser shock peened surface is laser shock peened using a set of sequences wherein each sequence comprises painting the surface such that the material on the surface is a paint suitable to generate a plasma which results in shock waves to form the region having deep compressive residual stresses and then continuously moving the part while continuously firing a stationary laser beam on the surface such that adjacent laser shock peened circular spots are hit in different ones of said sequences in said set.

13. A method as claimed in claim 12 wherein the laser beam is fired and the part moved so that the center points of adjacent spots in adjacent rows are offset from each other a generally equal amount in a direction along a line on which the center points are linearly aligned.

14. A method as claimed in claim 13 wherein each spot is hit more than one time using more than one set of said sequences.

* * * * *